(12) United States Patent
Kariis et al.

(10) Patent No.: US 8,187,503 B2
(45) Date of Patent: May 29, 2012

(54) LOW-EMISSIVE PAINT

(75) Inventors: Hans Kariis, Linköping (SE); Eva Hedborg Karlsson, Tjällmo (SE); Christina Åkerlind, Linköping (SE); Tomas Hallberg, Linköping (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 463 days.

(21) Appl. No.: 12/084,779

(22) PCT Filed: Nov. 9, 2006

(86) PCT No.: PCT/SE2006/001272
§ 371 (c)(1),
(2), (4) Date: Feb. 5, 2009

(87) PCT Pub. No.: WO2007/055640
PCT Pub. Date: May 18, 2007

(65) Prior Publication Data
US 2010/0012904 A1 Jan. 21, 2010

(30) Foreign Application Priority Data
Nov. 9, 2005 (SE) ...................................... 0502472

(51) Int. Cl.
*H01B 1/22* (2006.01)
*B05D 5/12* (2006.01)

(52) U.S. Cl. ...... 252/512; 252/513; 427/123; 250/505.1

(58) Field of Classification Search .................. 252/500, 252/512–513; 427/58, 123, 207.1; 250/505.1
See application file for complete search history.

(56) References Cited

U.S. PATENT DOCUMENTS

| | | |
|---|---|---|
| 5,147,968 A | 9/1992 | Epstein et al. |
| 5,650,461 A | 7/1997 | Wasserman et al. |
| 6,194,484 B1 | 2/2001 | Hugo |
| 6,231,789 B1 * | 5/2001 | Hawkins et al. ............... 252/512 |
| 7,074,348 B2 * | 7/2006 | Geer et al. ..................... 252/500 |
| 7,670,511 B2 * | 3/2010 | Horton ........................... 252/512 |
| 2002/0195353 A1 | 12/2002 | Dowling |
| 2004/0079928 A1 | 4/2004 | Geer et al. |

FOREIGN PATENT DOCUMENTS

| | | | |
|---|---|---|---|
| JP | 5105828 | | 4/1993 |
| KR | 2005066211 A | * | 6/2005 |

OTHER PUBLICATIONS

Kingston, Rob, "Disappearing Tricks", Chemistry in Britain, 1999, vol. 35, No. 10, pp. 24-26.
Bormashenko, Edward, et al. "Infrared Optics Applications fo Thin Polyaniline Emeraldine Base Films", Synthetic Metals, 2004, vol. 140, pp. 49-52.

* cited by examiner

*Primary Examiner* — Mark Kopec
(74) *Attorney, Agent, or Firm* — Jacobson Holman PLLC

(57) ABSTRACT

The present invention concerns a low-emissive paint comprising metal particles, a binder and a solvent. The metal particles consist of a metal with lower electro-negativity than 1.9 but higher than 1.1 or a mixture of such metals, and the binder consists of polyaniline—PANI—or a polymer where a thiophene group is included in the chain.

7 Claims, No Drawings

LOW-EMISSIVE PAINT

This is a national stage of PCT/SE2006/001272 filed Nov. 9, 2006 and published in Swedish.

The present invention relates to a low-emissive paint. The invention is derived from a wish to manufacture a low-emissive camouflage paint which can be used to adapt the signature of objects to prevent them from being detected by military reconnaissance. However, it is possible to utilise the invention in other applications than purely military, and it is the applicant's pronounced intention that the invention should be protected based on its composition and regardless of its application.

The technical development of radar-based and infrared-homing reconnaissance sensors and missiles has greatly advanced in the last decades. The military importance of this became obvious also to the general public in connection with the Gulf war. The development of countermeasures against detection has occurred parallel to the development of reconnaissance sensors. In this patent application, countermeasures against the infrared range will be discussed with reference also to the visual range.

A general and simple solution to the problem of providing a low infrared signature, that is reduced thermal emission, from a surface that is warmer than the surrounding, is to use a shiny metal surface. It is a characteristic property of good electric conductors that they also have high reflectance and, thus, a low emission factor in the infrared range and at least in part of the visible wavelength range. In many situations, however, this simple general method cannot be used. For military platforms, it is for instance obvious that shiny metal surfaces have an unsuitable visual signature.

Most of the thermal radiation from a hull surface that is heated either from the inside by engines or from the outside by the sun is in the thermal infrared wavelength range 2.5-25 µm (TIR). Above all in the wavelength bands 3-5 and 8-12 µm, referred to as the atmospheric transmission windows, it is easy for sensors to detect possible targets since the transmission of thermal radiation through the atmosphere is high here. Outside these ranges, the thermal radiation is reduced significantly more quickly.

By using low-emissive coatings, it is possible to reduce the thermal radiation from these objects und thus prevent detection. It is known to use low-emissive pigments in the form of metals, frequently aluminium flakes, in a binder to obtain a low-emissive surface in the TIR. However, the known binders for low-emissive camouflage paint, organic polymers, have strong absorption bands in, above all, the TIR range. The emissivity in these absorption bands is high, which is not desirable as discussed above.

By replacing, inter alia, the binder, the invention solves the current problem of creating a paint which has low emittance in the entire TIR range. This is achieved by the invention being designed as is evident from the independent claim. The remaining claims define advantageous embodiments of the invention.

The invention will in the following be described in more detail with reference to, inter alia, a concrete example.

The invention concerns a new type of camouflage paint where a conductive polymer is used as binder. It is known that certain polymers have very few and low absorption bands. The fact that the emission is low for the near infrared range, (NIR), 0.7-2 µm, is also known.

Conductive polymers which can be used in the invention comprise polyaniline (PANI) and polymers where a thiophene group is included in the chain, for instance poly(3, 4-ethenedioxythiophene) (PEDOT).

0.1-25% by weight of metal particles of any shape are mixed with the binder. In preferred embodiments of the invention, 5-15 weight % of metal particles are mixed with the binder. The particles may be spheres, flakes, threads or be designed in some other way. A characteristic measure of the particles, such as the diameter of a sphere or flake, should be between 0.1 and 100 µm.

The metal particles should be of a metal with lower electronegativity than 1.9 but higher than 1.1, for instance aluminium (Al), zinc (Zn), iron (Fe), magnesium (Mg), beryllium (Be), titanium (Ti), manganese (Mn), gallium (Ga), nickel (Ni) and chromium (Cr) or a mixture or two or more of these metals. Because of supply, price and other properties, aluminium is a highly convenient metal.

Adding such metal particles to a conductive polymer causes a synergy effect. A paint according to the invention has lower emittance than could be expected based on the emittance of the parts included. A traditional low-emissive paint, that is Al flakes in a traditional binder, has an emissivity of about 50%, while in the present invention it is easy to achieve an emissivity around 30% in the wavelength range 2.5-25 µm. For comparison, it may be mentioned that a common standard paint often has an emissivity around 80%.

To function as a paint, the paint must, in a manner that is known for paints, also contain a solvent in addition to pigments and binder. The solvent is evaporated and has no effect on the properties of a dried coat of paint. Like in other paints, different known solvents can be used. Water is an increasingly used solvent and can advantageously be used in the invention.

A polymer is usually not soluble in water. When using PEDOT in the invention, a substance that causes PEDOT together with the additive to be soluble in water is therefore added. Such an additive is polystyrene sulphonate—PSS. A mixing ratio which has been used with excellent results is 4 parts by weight of PEDOT to 9 parts by weight of PSS.

In addition to the components mentioned, it may in various applications be convenient in manufacture of paints to add, in prior art manner, known additives to increase the adhesion, mechanical strength and weatherproofness of the paint. An example of an additive that can improve the mechanical properties is Acronal, which can be purchased from BASF for instance. From a general point of view, the selected solvent and additives for the low-emissive paint are not important to the emissivity of the paint when dried. A person skilled in the art who manufactures paint is acquainted with different conceivable additives and solvents which are used in the same way as in other paints.

A mixture as described above with a high Al content (>5%) has low emittance also in the visual wavelength range. As the sum of emittance and reflectance is 1, provided that no transmission through the mixture occurs, it means that the mixture has high reflection also in visual wavelength range. As stated initially, this is not desirable in a camouflage paint and can be remedied by adding in a traditional manner a pigment which absorbs within this range, that is is perceived by the eye as dark and dull. In this way it is also possible to give the paint a certain desired visual colour. Suitable colour pigments are known from the manufacture of known camouflage paints.

A mixture according to the invention of metal particles in a binder in the form a conductive polymer may also be included as a loss layer in a radar absorbing structure.

EXAMPLE

Mixing a saturated aqueous solution of
4 weight units PEDOT
9 weight units PSS 0.08 weight units Acronal.

Mixing under stirring for 12 h.

Adding 10 weight % of Al flakes with a diameter of 2 μm to the saturated solution. Mixing under stirring for 12 h.

Painting the surface concerned. Letting dry. This results in emittance from the surface of about 30% in the wavelength range 2.5-25 μm.

The invention claimed is:

1. A method for reducing thermal emissions from a surface in the infrared wavelength range of 2.5-25 μm, which comprises applying a paint to the surface, the paint including metal particles, the metal particles being made from a metal selected from the group consisting of aluminium, zinc, iron, magnesium, beryllium, titanium, manganese, gallium, and chromium, in a binder solution containing poly(3,4-ethenedioxythiophene), polystyrene sulfonate, and water, the metal particles being 0.1-25% by weight of the paint.

2. The method as claimed in claim 1, characterized in that the metal is selected from the group consisting of aluminium, zinc, magnesium, beryllium, titanium, manganese, and chromium, or a mixture of metals selected from said group.

3. The method according to claim 1, wherein the metal particles are 5-15% by weight of the paint.

4. The method according to claim 3, wherein the metal is aluminium.

5. The method according to claim 1, wherein the metal is aluminium.

6. A method for reducing thermal emissions from a surface in the infrared wavelength range of 2.5-25 μm, which comprises applying a paint to the surface, the paint including nickel particles, in a binder solution containing poly(3,4-ethenedioxythiophene), polystyrene sulfonate, and water, the nickel particles being 0.1-25% by weight of the paint.

7. The method according to claim 6, wherein the nickel is present in the amount of 5-15% by weight of the paint.

* * * * *